No. 750,499. PATENTED JAN. 26, 1904.
E. A. SPERRY.
POWER TRANSMITTING MECHANISM.
APPLICATION FILED MAR. 5, 1903.
NO MODEL. 4 SHEETS—SHEET 1.

No. 750,499. PATENTED JAN. 26, 1904.
E. A. SPERRY.
POWER TRANSMITTING MECHANISM.
APPLICATION FILED MAR. 5, 1903.
NO MODEL. 4 SHEETS—SHEET 3.

No. 750,499. PATENTED JAN. 26, 1904.
E. A. SPERRY.
POWER TRANSMITTING MECHANISM.
APPLICATION FILED MAR. 5, 1903.
NO MODEL. 4 SHEETS—SHEET 4.

No. 750,499.

Patented January 26, 1904.

UNITED STATES PATENT OFFICE.

ELMER A. SPERRY, OF CLEVELAND, OHIO, ASSIGNOR TO NATIONAL BATTERY COMPANY, OF JERSEY CITY, NEW JERSEY, AND BUFFALO, NEW YORK, A CORPORATION OF NEW JERSEY.

POWER-TRANSMITTING MECHANISM.

SPECIFICATION forming part of Letters Patent No. 750,499, dated January 26, 1904.

Application filed March 5, 1903. Serial No. 146,281. (No model.)

*To all whom it may concern:*

Be it known that I, ELMER A. SPERRY, a citizen of the United States, residing in Cleveland, in the county of Cuyahoga, in the State of Ohio, have invented certain new and useful Improvements in Power-Transmitting Mechanism, of which the following is a specification, reference being had to the accompanying drawings, forming a part hereof.

This invention relates to power-transmitting mechanism in which provision is made for regulation of speed between the driver and the driven part, and the embodiment thereof herein presented is designed with especial reference to its application to electric car-lighting systems in which the power to drive the generator is derived from the car-axle, which is a source of power of variable speed, whereas the generator must be driven at a practically uniform speed, but with possibilities of variation to meet different requirements. It will nevertheless be understood that the invention is capable of application to other uses and is not to be limited to the particular use referred to. The peculiar conditions which are met in the transmission of power from a car-axle and which represent perhaps the severest conditions to which mechanism of the character referred to herein may be subjected are set forth with some fullness in another application filed concurrently herewith, to which reference may be had so far as may be necessary for a general understanding of such conditions, particularly as the present mechanism is generally similar to that described and shown in said application, although it differs in an important particular—viz., in that the employment of a slip-friction device is avoided in the present case—which is in fact particularly concerned with the devices whereby the driven part derives a practically uniform speed, subject to regulation, from the variable-speed driver. The provisions for accommodating the dancing and endwise floating movement of the car-axle or driver with reference to the truck-frame are substantially the same as those disclosed in the application referred to.

Figure 1:
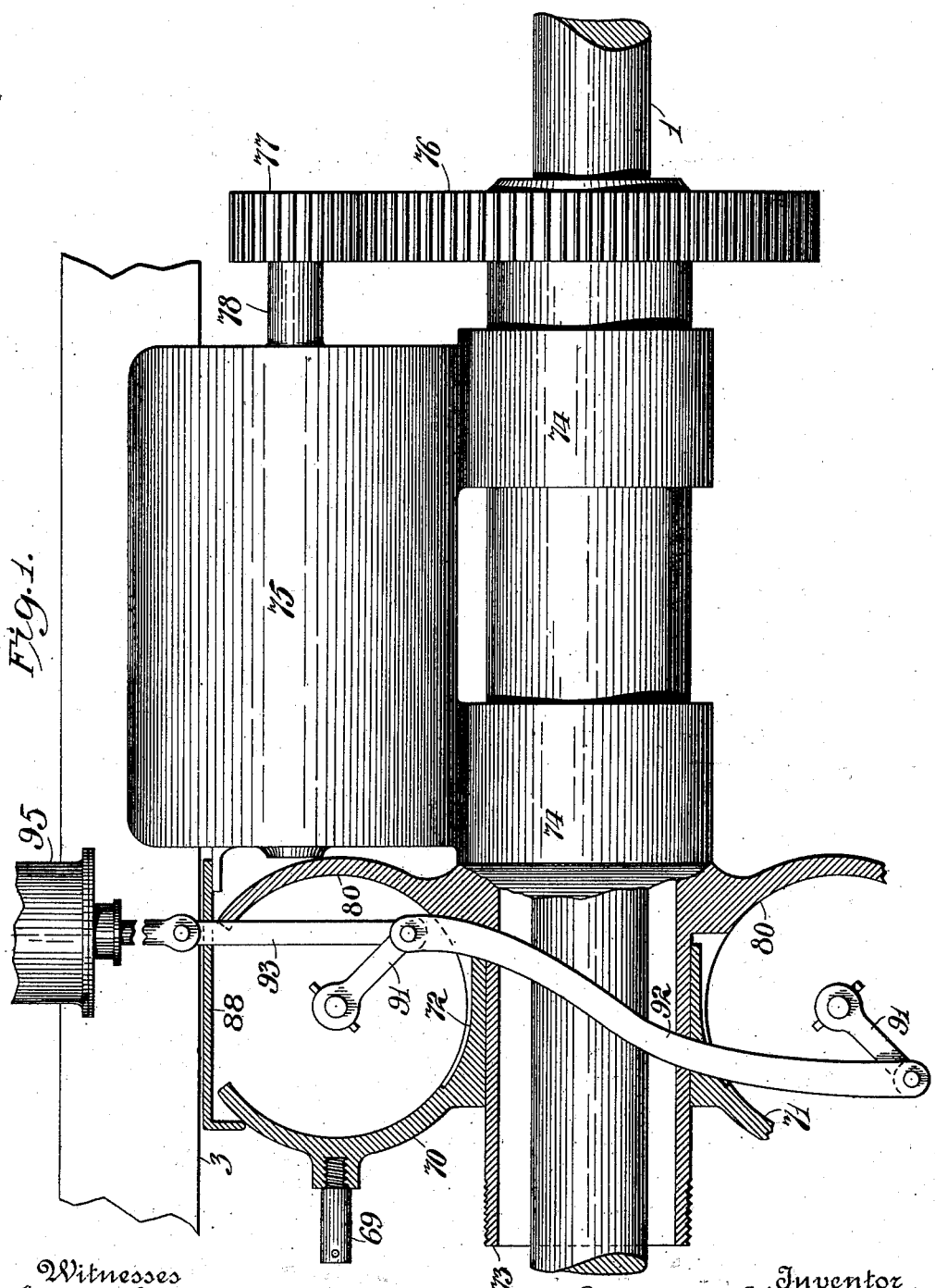
Figure 2:
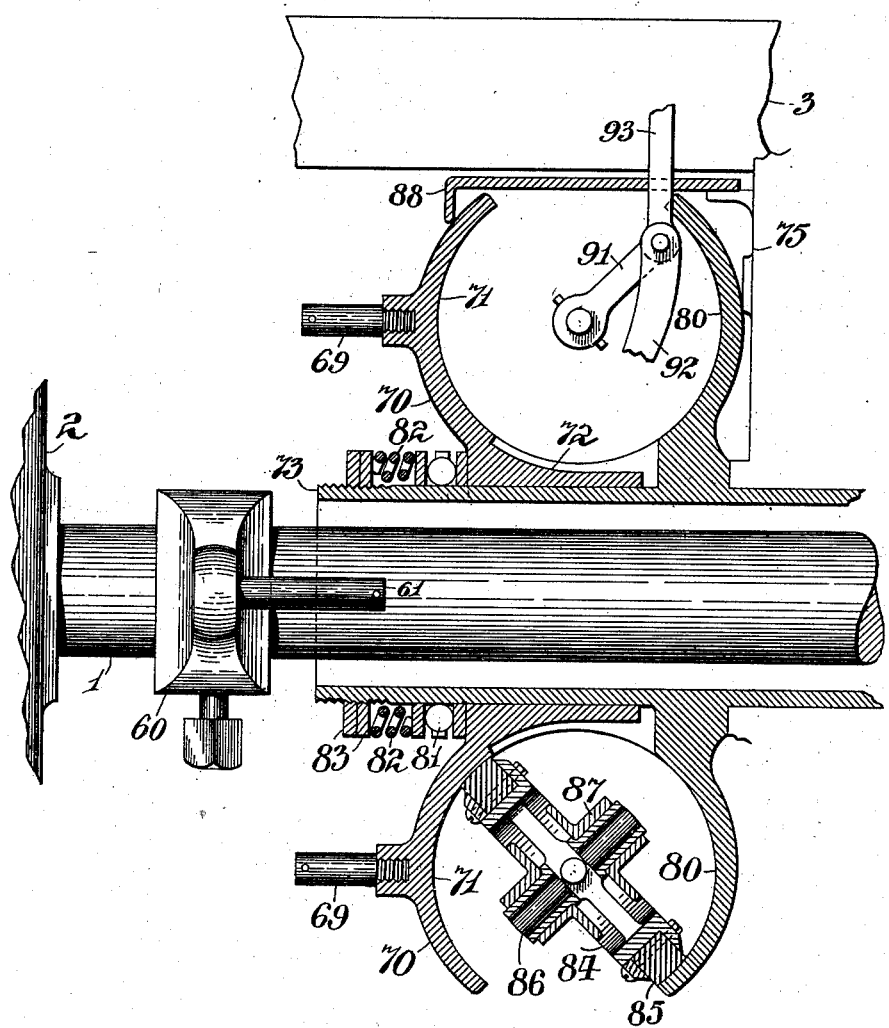
Figure 3:
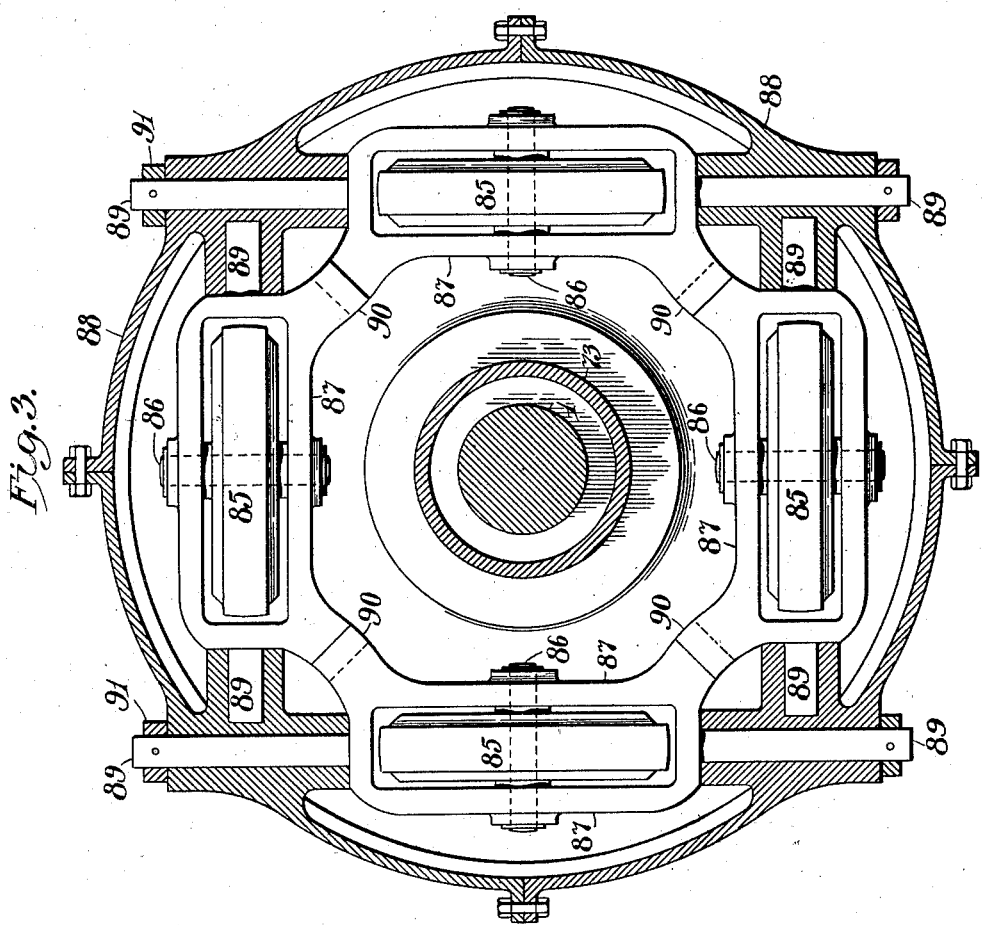
Figure 4:
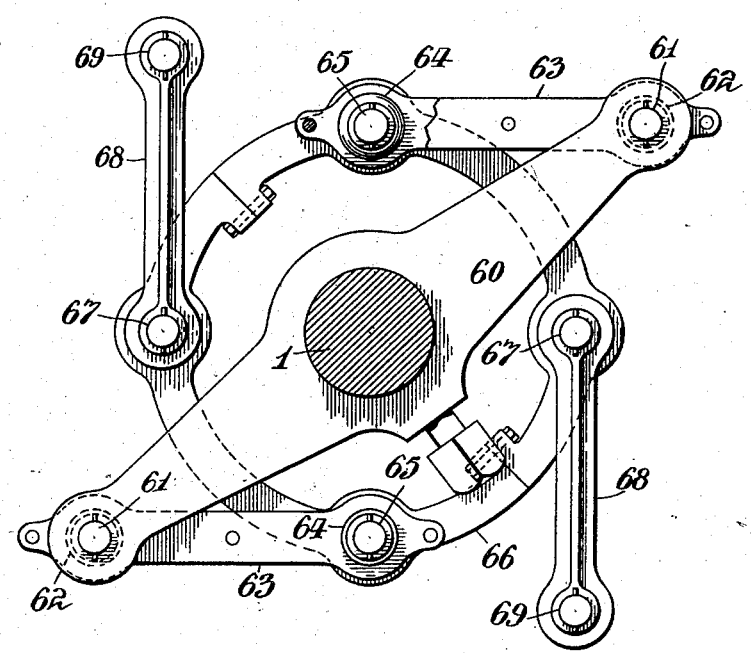

In the accompanying drawings, wherein for purposes of illustration and explanation of the nature of the invention is shown a convenient and practical embodiment of the invention above referred to, Figure 1 is a plan view, partly in horizontal section, showing a portion of a car-axle, a generator, and means for regulating the transmission of speed, the transmitting mechanism itself being shown only in part. Fig. 2 is a view of the transmitting mechanism mainly in horizontal central section, the transmitting-wheel on one side of the axle being shown in section, while on the other side of the axle the transmitting-wheel is omitted and the actuating-arm is shown. Fig. 3 is a detail view of the transmitting mechanism, partly in elevation and partly in section, on a plane transverse to the axis of the car-axle. Fig. 4 is a detail view of the universal coupling between the car-axle and the transmitting mechanism to accommodate the movements of the car-axle with respect to the truck-frame.

In the drawings the car-axle or variable-speed power source is represented at 1, with a portion of one of the car-wheels at 2 and a portion of the truck-frame which supports the generator or other part to be driven at 3. In the present case the universal coupling which accommodates the movement of the car-axle relative to the truck-frame is interposed between the car-axle and the power-transmitting device rather than between the power-transmitting device and the driven part, as in the application above referred to. The universal coupling will therefore be first described, so far as may be necessary, it being understood that it is substantially the same as the universal coupling described in said application. To the shaft or axle 1 is secured a carrier 60 in the form of an arm, which is provided at opposite ends with pins 61, upon which are mounted, by means of universal or ball joints 62, links 63, which are conveniently made double to embrace the ball of the joint at 62, as well as the ball of the joint at 64. The ball or universal joints at 64 are supported by pins 65, carried by a floating ring 66, which surrounds loosely the axle 1, being conveniently formed in two parts, which are bolted together, as shown in Fig. 4. The pins 65 are located at diametrically opposite points of the ring 66, and at intermediate points are secured pins 67, upon which in turn are mounted links 68, which at their opposite ends engage pins 69 of the driver 70. It will be observed that the links 68 are disposed at right angles with respect to the links 63, so that the dancing movements of the axle with respect to the truck-frame shall be accommodated, while the universal joints at 62 and 64 accommodate the endwise floating movement of the axle with respect to the truck-frame. It will also be observed that in this case the employment of a floating ring, with the links connected thereto at four separate points, permits a somewhat better distribution of strains than in the case of a floating frame with both sets of links connected thereto at two points only, as in the application above referred to, although the action of the universal coupling thus constituted remains the same.

The carrier 70, to which the links 68 are connected by the pins 69 and which is the driving member of the transmitting mechanism, is annular, has its working face 71 curved in the arc of a circle, and has a sleeve 72, by which it is mounted for rotation and endwise movement upon the hollow shaft or sleeve 73, which in turn is mounted in bearings 74, carried by the truck-frame, and it may be integral with the casing 75 of the generator. The shaft or sleeve 73 carries a gear 76, which meshes with a gear 77 on the shaft 78 of the generator, as shown in Fig. 1. The carrier or driver 70 transmits motion through transmitting-wheels hereinafter described to a similar part 80, having a similar concentrically-curved working face and secured to or formed integral with the sleeve 73. The driver 70, while free for relative rotative movement with respect to the sleeve 73, must be pressed at all times toward the driven part 80. To this end a ball-bearing 81, backed by a stiff spring 82, is arranged to bear against a shoulder on the driver 70 and is pressed forward by rings 83, threaded upon the end of the sleeve 73.

The wheels, which are placed between the driver 70 and the driven part 80 and through which power is transmitted from one to the other by contact with both, are not only supported so as to rotate about axes which lie in planes radial to the axis of rotation of the driver 70 and driven part 80, but are also supported so that the axis of each wheel may swing in its plane and the line of contact of the transmitting-wheel with the driver and with the driven part may be moved to different positions on the curved working face of each, as indicated in Fig. 2. In the position of the transmitting-wheel represented in Fig. 2, in which the line of contact of the transmitting-wheel with the working face of the driver is nearest to the axis of rotation of the driver, while the line of contact of the wheel with the curved working face of the driven part 80 is farthest from the axis of rotation of such driven part, the speed of rotation of the driven part with reference to the speed of rotation of the driver will be lowest, while if the axis of the transmitting-wheel is shifted in the same plane, so that the lines of contact of the wheel with the driver and the driven part shall be as represented by the positions of the arms 91 in Fig. 1, the speed of rotation of the driven part with reference to the speed of rotation of the driver will be highest. A shifting of the transmitting-wheel within limits which are entirely practicable, as will be readily understood, gives a wide variation in the speed transmitted from the driver to the driven part. The means for supporting and shifting the transmitting-wheels which have been chosen for illustration will now be described. Each transmitting-wheel may comprise a suitable frame 84, having in its edge a contact-ring 85, of compressed leather or other suitable material, and a short axle 86, which has its bearings in a frame 87, mounted to swing in a casing 88, which forms a shroud for the driver and the driven part, with the transmitting-wheels, to exclude dust, &c., and may be supported upon the truck-frame 3, as represented in Fig. 2, preferably so as to be movable endwise with respect to the axis of rotation and so permit the transmitting-wheels 85 to adjust themselves between the movable driver 70 and the driven part 80. The casing 88 is conveniently made in four parts, as represented in Fig. 3, which may be bolted together, and furnishes bearings for the spindles 89 of the several frames 87. In order that the aggregate contact-surface of the transmitting-wheels may be the maximum possible in order to secure efficient transmission with a minimum of loss by slip without requiring each transmitting-wheel to have such an undue width as to occasion grinding between its face and the curved working faces of the driver and the driven part, it is desirable to provide as many transmitting-wheels as possible, four being a practicable number, as indicated in Fig. 3, and, as represented in said figure, the several frames may be provided with intermeshing gear-segments, as at 90, to insure uniform movement of the several transmitting-wheels.

Any convenient means for shifting the frames and the transmitting-wheels may be employed. In the embodiment of the invention represented in the drawings the spindles 89 of the vertical frames are extended through the casing 88 and are provided at their upper ends with arms 91, which may be suitably coupled, as by a link 92, and connected, as by a link 93, with the means employed to control the position of the transmitting-wheels, such as the piston-rod of a cylinder 95, to which fluid under pressure may be admitted to effect the desired movement of the piston and of the transmitting-wheels.

In the use of the improved transmission mechanism, particularly as applied to the driving of an electric generator from the axle of a railway-car, the several parts of the transmission mechanism are supported upon the truck-frame, the relative bodily movements of the axle with respect to the truck-frame being accommodated by the universal coupling herein described. The driver or carrier 70 therefore rotates with the car-axle, partaking of its variations in speed. From the driver 70 power is transmitted to the driven part 80 through the transmitting-wheels 84, and the positions of the latter with respect to the inner and outer circumference of the curved working faces of the driver and the driven part are shifted from time to time by any suitable means, which, if desired, may be controlled automatically by the requirements of the lighting system, so that the speed of rotation of the driven part shall at all times be regulated through the shifting of the transmitting-wheels to give to the generator the speed which the demands of the system require.

It will be understood that details of construction and arrangement will be varied in each case to suit the particular requirements of that case and that the invention is not to be limited to the particular construction and arrangement of parts herein shown and described.

I claim as my invention—

1. The combination with a car-axle, a truck-frame and a generator, of a sleeve mounted in bearings in the truck-frame, a power-transmission mechanism comprising a driver mounted for rotation on said sleeve and a driven part fixed to said sleeve, said driving and driven part having opposed annular working faces curved substantially in the arc of a circle, and a transmitting-wheel interposed between said working faces and in contact therewith, connections between the axle and the driver, gearing between the sleeve and the generator, and means to shift said wheel to vary the position of the lines of contact of said wheel with said working faces.

2. The combination with a car-axle, a truck-frame and a generator, of a sleeve mounted in bearings in the truck-frame concentric with the axle, a power-transmission mechanism mounted on said sleeve and comprising an annular driver, an opposed annular driven part, and a transmitting-wheel shiftable between said driver and driven part to vary the speed of the latter, connections between the axle and the driver, connections between the driven part and the generator, and means to shift said transmitting-wheel.

3. The combination with an axle, truck-frame and generator, of a sleeve mounted in bearings in the truck-frame concentric with the axle, a power-transmission mechanism comprising an annular driver loose on said sleeve, an opposite annular driven part fixed to said sleeve, a transmitting-wheel shiftable between said driver and driven part to vary the speed of the latter, connections between the axle and the driver, gearing between the sleeve and the generator, and means to shift said wheel.

4. The combination with an axle, a truck-frame and a generator, of a sleeve mounted in bearings in the truck-frame concentric with the axle, a power-transmission mechanism mounted on the sleeve and comprising an annular driver, an opposed annular driven part and a transmitting-wheel shiftable between the driver and the driven part to vary the speed of the latter, a universal coupling between the axle and the driver, connections between the driven part and the generator, and means to shift said wheel.

5. The combination with an axle, a truck-frame and a generator, of a sleeve mounted in bearings in the truck-frame concentric with the axle, a variable-speed power-transmission mechanism mounted on said sleeve, a universal coupling between the axle and the driving member of said transmission mechanism, and connections between the driven member of said transmission mechanism and the generator.

6. The combination with an axle, truck-frame and generator, of a variable-speed power-transmission mechanism mounted concentric with the axle, a universal coupling between the axle and the driving member of said variable-speed transmission mechanism, and connections between the driven member of said variable-speed power-transmission mechanism and the generator.

7. The combination with an axle, truck-frame and generator, of a power-transmission mechanism mounted concentric with the axle and a universal coupling between the axle and the driving member of the power-transmission mechanism and comprising a floating ring, a driver secured to the axle, links connecting said driver to said ring, and links connecting said ring to said power-transmission mechanism.

8. The combination with an axle, truck-frame and generator, of a power-transmission mechanism concentric with the axle and a coupling between the axle and the power-transmission mechanism and comprising a floating ring, a driver secured to the axle, links connecting the driver with the ring at opposite points, and links connecting the ring at intermediate points with the power-transmission mechanism.

This specification signed and witnessed this 2d day of March, A. D. 1903.

ELMER A. SPERRY.

In presence of—
ANTHONY N. JESBERA,
W. B. GREELEY.